United States Patent [19]
Laurent et al.

[11] 3,723,484
[45] Mar. 27, 1973

[54] 17-CHLORO STEROIDS

[75] Inventors: Henry Laurent; Rudolf Wiechert; Karl Heinz Kolb, all of Berlin, Germany

[73] Assignee: Schering A.G., Berlin and Bergkamen, Germany

[22] Filed: Sept. 15, 1971

[21] Appl. No.: 180,898

[30] Foreign Application Priority Data

Sept. 18, 1970 Germany....................P 20 47 105.0

[52] U.S. Cl..............................260/397.45, 424/243
[51] Int. Cl..............................C07c 169/30
[58] Field of Search ....... Machine Searched Steroids

[56] References Cited

UNITED STATES PATENTS 3,312,692  4/1967  Oliveto et al.......................260/239.5
3,519,651  7/1970  Uskokovic.........................260/343.2

Primary Examiner—Elbert L. Roberts
Attorney—Millen, Raptes & White

[57] ABSTRACT

17-Chloro anti-inflammatory steroids of the formula

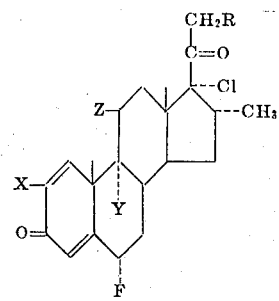

wherein X is H or Cl; Y is F or Cl; Z is OH, F or, when Y is Cl, Cl; and R is a free or esterified OH group, are produced by simultaneously reacting, in the presence of a sulfone, the corresponding 17-hydrogen compound or the corresponding $\Delta^{9(11)}$-17-hydrogen compound with hydrogen fluoride and with an N-chloroacylamide or N-chloroacylimide.

18 Claims, No Drawings

17-CHLORO STEROIDS

BACKGROUND OF THE INVENTION

This invention relates to novel 17-chloro steroids and compositions comprising them, to a process for their production and to their use as anti-inflammatory agents.

SUMMARY OF THE INVENTION

According to this invention, there is provided novel anti-inflammatory 17-chloro steroids of the general Formula I

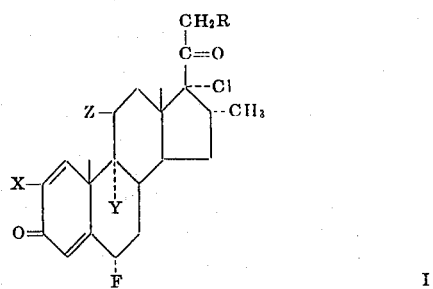

wherein X is H or Cl; Y is F or Cl; Z is OH, F or, when Y is Cl, Cl, and R is a free or esterified OH group.

This invention also relates to a process for the preparation of compounds of Formula I wherein a compound of the general Formula II

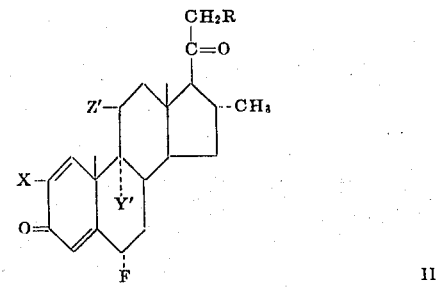

wherein X has the values given above; Y' is Y as defined above; and Z' is Z as defined above or Y' and Z' collectively are a 9(11) carbon-carbon bond; and R is an esterified OH group, is simultaneously reacted, in the presence of a sulfone, with hydrogen fluoride and with an N-chloracylamide or an N-chloracylimide. Optionally, the ester group R is subsequently saponified and, if desired, the thus-produced 21-hydroxy steroid of Formula I is again esterified to form a different 21-ester group.

DETAILED DISCUSSION

Preferred compounds of this invention are those of Formula I wherein
  a. X is Cl;
  b. Z is OH or F;
  c. R is OAc in which Ac is the acyl radical of a hydrocarbon carboxylic acid containing one to 15 carbon atoms;
  d. X is Cl and Z is OH or F;
  e. X is Cl and R is as defined in (c);
  f. Z is OH and R is as defined in (c); and
  g. X is Cl, Z is OH or F and R is as defined in (c).

Since the 21-ester group can be subsequently saponified, R can be any esterified OH group. Preferred are esters of physiologically acceptable acids. Preferred acids are hydrocarbon carboxylic acids, e.g., of up to 15 carbon atoms, preferably two to 12 carbon atoms. These acids can be aliphatic, cycloaliphatic, aromatic, or mixed aromatic-aliphatic acids. Examples of such acids are straight or branched chain alkanoic, e.g., formic acid, acetic acid, propionic acid, butyric acid, valeric acid, caproic acid, enanthic acid, undecylic acid, trimethylacetic acid, diethylacetic acid, tert.-butylacetic acid; aralkanoic, e.g., phenylacetic acid; cycloalkanoic, e.g., cyclopentylpropionic acid; and aryl, e.g., benzoic acid.

As is well known in steroid chemistry, when the free 21-OH steroid possesses the desired activity, the exact nature of the acyl moiety of an ester of such an active 21-OH compound is not critical. Thus, equivalents of the esters described above are esters corresponding to acids bearing one or more simple substituents which do not affect the fundamental character of the steroid. Thus, an acid described above can be substituted with halogen, e.g., mono-, di- or tri-chloro- acetic acid, or any other substituted acid which has been employed to form an ester of a 21-hydroxy steroid. Esters of di- and poly-basic acids, e.g., succinic and adipic acids, can be used to form water soluble half-esters. Also suitable are esters of the usual inorganic acids, such as, for example, sulfuric acid and phosphoric acid which also can be used to produce water soluble half esters by formation of an alkali metal salt thereof.

The process of this invention can be conducted using either an N-chloracylamide or an N-chloracylimide, e.g., N-chloracetamide and N-chlorosuccinimide. In order to obtain a smooth progression of the reaction, the N-chloracylimides, e.g., N-chlorosuccinimide, are preferably employed.

The process of this invention is conducted in the presence of a sulfone. Examples of suitable sulfones are di-lower-alkyl sulfones wherein each alkyl group contains one to six carbon atoms including dimethyl sulfone, diethyl sulfone, ethyl-n-propyl sulfone, di-n-butyl sulfone, and the lower-alkylene sulfones, e.g., containing four to six carbon atoms, including tetramethylene sulfone and pentamethylene sulfone.

As will be apparent to those skilled in the art, other sulfones of more complex structure can be employed, as long as the sulfone group is of comparable activity. Mixtures of these sulfones can also be employed.

The reaction can be conducted using an excess of hydrogen fluoride as the reaction solvent. The reaction can also be conducted in an inert solvent, e.g., chloroform, methylene chloride, ethylene chloride, diethyl ether, diisopropyl ether, tetrahydrofuran, dioxane, 1,2-dimethoxy-ethane, benzene, toluene, dimethylformamide, or N-methylpyrrolidone.

The process of the present invention is preferably conducted at below room temperature, preferably between about −10° C. and +10° C.

In the process of this invention, the hydrogen atom on the C-17 atom of the steroid is exchanged for a chlorine atom, with the normal configuration of the side chain being retained. This course of the reaction is surprising because it is known that there is no substitution of the hydrogen by chlorine on the C-17 atom of the starting compounds of this invention with hydrogen fluoride and an N-chloracylamide or an N-chloracylimide alone. The novel compounds possess excellent topical anti inflammatory activity, as evidenced by the vasoconstriction test on experimentally hyperemized human skin. The activity of compounds II through V of this invention in this test was compared with the known highly effective antiphlogistic steroid 6α-fluoro-11 β,21-dihydroxy-16α-methyl-1,4-pregnadiene-3,20-dione (I).

The vasoconstriction test utilized to show clinically the high activity of the compounds of this invention as topical anti-inflammatory agents was conducted as follows: On the backs of volunteers, the stratum corneum was divided by the application and tearing off of an adhesive film having a width of 2 cm., which application was conducted 20 times at the same spot. As a result, a pronounced hyperemia was thus produced. Then, within the stripped area, under the same application of pressure, approximately 50 mg. of a water/oil salve base containing, in each case, respectively, 0.01 and 0.001 percent of the compound being tested, were applied to marked 4 cm² areas. The backs of the patients were then photographed at specific intervals with color film (Kodak). In order to evaluate hyperemia and vasoconstriction, the color of the individual zones of the skin on the Kodak color film were translated into brightness values. This was done by projecting sections of the color film through a perforated screen on an interference filter. Such sections differ from one another in brightness, depending on the degree of vasoconstriction obtained at that section. As the brightness indicator, a secondary electron multiplier was employed, and for determining the chromaticity value, the anode current of the secondary electron multiplier was measured. To determine the vasoconstriction effect, which is a representative syndrome of topical anti inflammatory effectiveness, there was measured onset of effect, degree of effectiveness, and duration of effect. The chromaticity value of the treated and untreated stripped skin was determined and compared with the chromaticity value of the normal skin, the chromaticity value of the normal skin being assigned the value 100 and the chromaticity value of the untreated stripped skin was assigned the value 0. Slight, medium, and high vasoconstriction effects were evaluated between 0 and 100.

The results of this testing is shown in the table below.

TABLE

Vasoconstriction on Experimentally Hyperemized Skin (Color Values of Normal Skin = 100; Color Values of Hyperemized Skin = 0)

| | Substance | Dosage (percent Concentration) | Observation Time in Hours | | | | | |
|---|---|---|---|---|---|---|---|---|
| | | | 1 | 2 | 3 | 4 | 5 | 6 |
| I | 6α-Fluoro-11β,21-dihydroxy-16α-methyl-1,4-pregnadiene-3,20-dione | 0.01 | 0 | 20 | 40 | 50 | 75 | 100 |
| II | 6α,11β-Difluoro-9,17-dichloro-21-acetoxy-16α-methyl-1,4-pregnadiene-3,20-dione | 0.001 | 5 | 10 | 30 | 85 | 90 | 100 |
| III | 6α,11β-Difluoro-9,17-dichloro-21-trimethyl acetoxy-16α-methyl-1,4-pregnadiene-3,20-dione | 0.001 | 5 | 20 | 40 | 70 | 90 | 100 |
| IV | 6α,11β-Difluoro-9,17-dichloro-21-valeryloxy-16α-methyl-1,4-pregnadiene-3,20-dione | 0.001 | 5 | 25 | 45 | 60 | 90 | 100 |
| V | 6α,9-Difluoro-17-chloro-11β-hydroxy-21-acetoxy-16α-methyl-1,4-pregandiene-3,20-dione | 0.001 | 0 | 10 | 20 | 50 | 70 | 80 |

The experimental results set forth in the table show that only about one-tenth of the dosage of compounds II through V of this invention is required to attain the same therapeutic effect as the comparison compound I.

The novel compounds of this invention are useful for the treatment of a variety of inflammatory conditions, e.g., a. topical administration: variety of types of eczemas, neurodermitis, erythrodermia, first-degree burns, pruritus vulvae and ani, rosacea, erythematodes cutaneus, psoriasis, lichen ruber planus, verrucosus and contact dermatitis;

b. oral administration: acute and chronic polyarthritis, neurodermitis, bronchial asthma, hay fever, and others.

The compounds can be employed in the treatment of inflammatory conditions formulated in conventional pharmaceutically acceptable carriers in the forms customarily employed in pharmaceuticals. For oral administration, especially suitable are tablets, dragees, capsules, pills, suspensions and solutions. Suitable excipients for tablets are, for example, lactose, amylose, talc, gelatin, magnesium stearate, and the like.

For topical administration, suitable are powders, solutions, suspensions, aerosols, and vaginal suppositories. For parenteral application, aqueous and oily solutions or suspensions can be employed.

The compounds of this invention are formulated so as to provide, for example 5 to 50 mg. of the effective agent in admixture with 50 mg. to 1,0g. of a pharmacologically indifferent excipient, i.e., a pharmaceutically acceptable carrier, per unit dosage, e.g., per tablet.

The novel effective agents are usually administered topically at concentrations in the pharmaceutical carrier of between 0,01 and 1,0 percent, preferably 0,05 to 0,50 percent.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

EXAMPLE 1

At −78° C., 15 ml. of anhydrous hydrogen fluoride is mixed with 5 ml. of tetramethylene sulfone, 5.0 g. of 6α-fluoro-21-acetoxy-16α-methyl-1,4,9(11)-pregnatriene-3,20-dione and 10 g. of N-chlorosuccinimide, and the mixture is allowed to stand for 7 days at +3° C. The reaction solution is then poured, under agitation, into 300 ml. of a mixture of equal parts of water, ice, and 25 percent strength ammonium hydroxide solution. The thus-precipitated product is vacuum-filtered, washed with water, and taken up in methylene chloride. The solution is washed with 10 percent sodium sulfite solution and water, dried over sodium sulfate, and evaporated under vacuum. The residue is chromatographed on silica gel. With 11–13 percent of acetone/hexane, after recrystallization from acetone/hexane, 1.12 g. of 6α,11β-difluoro-9,17-dichloro-21-acetoxy-16α-methyl- 1,4-pregnadiene-3,20-dione is obtained, m.p. 224°–226° C. $[\alpha]_D^{25} = +28°$ (chloroform).
UV: $\epsilon_{235} = 16,600$ (methanol).

EXAMPLE 2

8 g. of 6α-fluoro-21-trimethylacetoxy-16α-methyl-1,4,9(11)-pregnatriene-3,20-dione is reacted, as described in Example 1, for 5 days at +3° C. The crude product is chromatographed on silica gel. With 5–7 percent of acetone/hexane, after recrystallization from acetone/hexane, 2.82 g. of 6α,11β-difluoro-9,17-dichloro-21-trimethylacetoxy-16β-methyl-1,4-pregnadiene-3,20-dione is obtained, m.p. 240°–241° C. $[\alpha]_D^{25} = +30°$ (chloroform).
UV: $\epsilon_{235} = 16,800$ (methanol).

EXAMPLE 3 a. A solution of 20 g. of 6α-fluoro-11β,21-dihydroxy-16α-methyl-1,4-pregnadiene-3,20-dione in 40 ml. of pyridine and 20 ml. of valeric acid anhydride is agitated for 2 hours at room temperature. The reaction product is precipitated with 600 ml. of water. The mixture is then stirred for one hour, vacuum-filtered, washed with water and 100 ml. of hexane, and thereafter dried over phosphorus pentoxide under vacuum at 40° C. Yield: 24.3 g. of 6α-fluoro-11β-hydroxy-21-valeryloxy-16α-methyl-1,4-pregnadiene-3,20-dione, m.p. 201–202° C.

b. A solution of 12 g. of 6α-fluoro-11β-hydroxy-21-valeryloxy-16α-methyl-1,4-pregnadiene-3,20-dione in 120 ml. of pyridine is mixed, under ice cooling, with 5 ml. of thionyl chloride and maintained at 5° C. for one hour. The reaction product is precipitated with 600 ml. of water, vacuum-filtered, washed with water, and dried at 40° C. under vacuum over phosphorus pentoxide. Yield: 10.2 g. of 6α-fluoro-21-valeryloxy-16α-methyl-1,4,9(11)-pregnatriene-3,20-dione, m.p. 119°–122° C.

c. 15.0 g. of 6α-fluoro-21-valeryloxy-16α-methyl-1,4,9(11)-pregnatriene-3,20-dione is reacted, as described in Example 1, for 4 days at +5° C. The crude product is chromatographed on silica gel. With 6–9 percent of acetone/hexane, after recrystallization from acetone/hexane, 6.42 g. of 6α,11β-difluoro-9,17-dichloro-21-valeryloxy-16α-methyl-1,4-pregnadiene-3,20-dione is obtained, m.p. 170°–171° C. $[\alpha]_D^{25} = +31°$ (chloroform).
UV: $\epsilon_{236} = 17,000$ (methanol).

EXAMPLE 4

5.0 g. of 6α,9-difluoro-11β-hydroxy-21-acetoxy-16α-methyl-1,4-pregnadiene-3,20-dione is reacted, as described in Example 1, for 5 days at +3° C. The crude product is chromatographed on silica gel. With 25–27 percent of acetone/hexane, after recrystallizing twice from acetone/hexane, 1.12 g. of 6α,9-difluoro-17-chloro-11β-hydroxy-21-acetoxy-16α-methyl-1,4-pregnadiene-3,20-dione is obtained, m.p. 223°–224° C. $[\alpha]_D^{25} = +10°$ (chloroform).
UV: $\epsilon_{237} = 16,900$ (methanol).

EXAMPLE 5

2.0 g. of 6α,11β-difluoro-9,17-dichloro-21-acetoxy-16α-methyl-1,4-pregnadiene-3,20-dione is dissolved in a mixture of 100 ml. of methanol and 40 ml. of methylene chloride. The solution is mixed with 1.0 ml. of 70 percent strength perchloric acid and stored for 4 days at room temperature under a nitrogen atmosphere. The mixture is then diluted with methylene chloride, washed with sodium bicarbonate solution and water, dried with sodium sulfate, and concentrated under vacuum. The residue is recrystallized twice from acetone/hexane. Yield: 1.0 g. of 6α,11β-difluoro-9,17-dichloro-21-hydroxy-16α-methyl-1,4-pregnadiene-3,20-dione, m.p. 212°–213° C. (under decomposition). $[\alpha]_D^{25} = +40°$ (chloroform). UV: $\epsilon_{236} = 16,600$ (methanol).

EXAMPLE 6

At −78° C., 9 ml. of anhydrous hydrogen fluoride is mixed with 3 g. of dimethyl sulfone, 3.0 g. of 6α-fluoro-21-acetoxy-16α-methyl-1,4,9(11)-pregnatriene-3,20-dione, and 6 g. of N-chlorosuccinimide, and the mixture is allowed to stand for 3 days at +2° C. Thereafter, the reaction product is worked up as described in Example 1 and chromatographed. Yield: 1.4 g. of 6α,11β-difluoro-9,17-dichloro-21-acetoxy-16α-methyl-1,4-pregnadiene-3,20-dione, m.p. 230°–231° C. (from acetone/hexane). $[\alpha]_D^{25} = +28°$ (chloroform). UV: $\epsilon_{235} = 16,200$ (methanol).

EXAMPLE 7

A solution of 135 mg. of 6α,11β-difluoro-9,17-dichloro-21-hydroxy-16α-methyl-1,4-pregnadiene-3,20-dione is reacted with 2 ml. of pyridine and 0.8 ml. of valeric acid anhydride for 16 hours at room temperature. Thereafter, the reaction mixture is subjected to steam distillation; the distillation residue is extracted with methylene chloride, and the extract is concentrated, thus obtaining 120 mg. of 6α,11β-difluoro-9,11-dichloro-21-valeryloxy-16α-methyl-1,4-pregnadiene-3,20-dione.

EXAMPLE 8

An amount of 0.2 g. of 6αβ-difluoro-9,17-dichloro-21-hydroxy-16α-methyl-1,4-pregnadiene-3,20-dione is mixed with 5 ml. of pyridine and 1 ml. of enanthic acid anhydride. The reaction mixture is allowed to stand under a nitrogen atmosphere for two days at room temperature. The reaction product is poured into 50 ml. of water and extracted five times with methylene chloride. The organic phase is washed first with 20 ml. of 1N sodium hydroxide solution, then twice with water, thereupon once with 10 ml. of 1N acetic acid, and finally twice with water. After drying the organic solution with sodium sulfate and removing the solvent by evaporation under vacuum, there remains 6α,11β-difluoro-9,17-dichloro-21-heptanoyloxy-16α-methyl-1,4-pregnadiene-3,20-dione, m.p. 165°–167° C. $[\alpha]_D^{25}$ = +32° (chloroform). UV: $\epsilon_{235}$ = 16,700 (methanol).

EXAMPLE 9

An amount of 0.5 g. of 6α,9-difluoro-17-chloro-11β-hydroxy-21-acetoxy-16β-methyl-1,4-pregnadiene-3,20-dione is dissolved in 60 ml. of methanol/methylene chloride 1:1 and mixed with 1 ml. of 70 percent strength perchloric acid. The mixture is allowed to stand under an argon atmosphere for 4 days at room temperature. Then, the mixture is mixed with 20 ml. of saturated sodium bicarbonate solution, 100 ml. of water is added thereto, and the mixture is extracted six times with 50 ml. increments of methylene chloride. After drying the solution with sodium sulfate and removing the solvent by vacuum-filtering, one obtains, after conducting a recrystallization from hexane/acetone which contains several drops of methanol, 0.327 g. of 6α,9-difluoro-17-chloro-11β,21-dihydroxy-16α-methyl-1,4-pregnadiene-3,20-dione, melting at 229°–230° C. under decomposition. $[\alpha]_D^{25}$ = +28° (chloroform). UV: $\epsilon_{236}$ = 17,000.

The preceding examples can be repeated with similar success by substituting the generically and specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A 17-chloro steroid of the formula

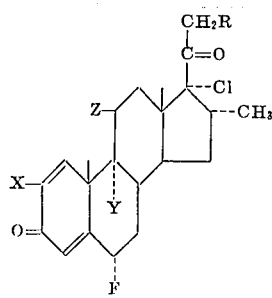

wherein X is H or Cl; Y is F or Cl; Z is OH, F or, when Y is Cl, Cl; and R is a free or esterified hydroxy group.

2. A compound of claim 1 wherein R is OH or OAc in which Ac is the acyl radical of a hydrocarbon carboxylic acid containing one to 15 carbon atoms.

3. A compound of claim 2 wherein X is a hydrogen atom and Z is OH or F.

4. A compound of claim 3 wherein Z is OH.

5. A compound of claim 3 wherein Z is F.

6. A compound of claim 3 wherein Y is Cl.

7. A compound of claim 1, 6α,11β-difluoro-9,17-dichloro-21-hydroxy-16α-methyl-1,4-pregnadiene-3,20-dione.

8. A compound of claim 1, 6α,11β-difluoro-9,17-dichloro-21-acetoxy-16α-methyl-1,4-pregnadiene-3,20-dione.

9. A compound of claim 1, 6α,11β-difluoro-9,17-dichloro-21-trimethyl-acetoxy-16α-methyl-1,4-pregnadiene-3,20-dione.

10. A compound of claim 1, 6α,11β-difluoro-9,17-dichloro-21-valeryloxy-16α-methyl-1,4-pregnadiene-3,20-dione.

11. A compound of claim 1, 6α,9-difluoro-17-chloro-11β-hydroxy-21-acetoxy-16α-methyl-1,4-pregnadiene-3,20-dione.

12. A compound of claim 1, 6α,11β-difluoro-9,17-dichloro-21-heptanoyloxy-16α-methyl-1,4-pregnadiene-3,20-dione.

13. A compound of claim 1, 6α,9-difluoro-17-chloro-11β,21-dihydroxy-16α-methyl-1,4-pregnadiene-3,20-dione.

14. A process for the preparation of 17-chloro steroids of claim 1, which comprises simultaneously reacting, in the presence of a sulfone, a compound of the formula

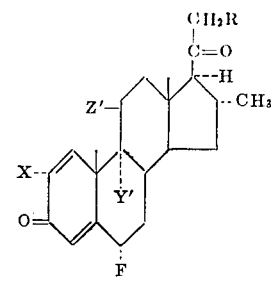

wherein X is H or Cl; Y' is F or Cl and Z' is OH, F or, when Y' is Cl, Cl, or, collectively, Y' and Z' are a 9(11) carbon-carbon bond; and R is an esterified OH group, with hydrogen fluoride and with an N-chloracylamide or an N-chloracylimide.

15. A process according to claim 14 wherein the N-chloracylimide is N-chlorosuccinimide.

16. A process according to claim 14 wherein the sulfone is dimethyl sulfone or tetramethylene sulfone.

17. A process according to claim 14 wherein the reaction is conducted at a temperature of between about −10° C. and +10° C.

18. A process according to claim 14 wherein the reaction is conducted in anhydrous hydrogen fluoride.

* * * * *